March 16, 1937. F. B. SCHILLING 2,074,028
APPARATUS AND METHOD FOR DRYING AND INCINERATING
SEWAGE AND WASTE MATERIAL
Filed April 6, 1935

INVENTOR
Frederick B. Schilling
Ward, Crosby + Neal
ATTORNEYS

Patented Mar. 16, 1937

2,074,028

UNITED STATES PATENT OFFICE 2,074,028

APPARATUS AND METHOD FOR DRYING AND INCINERATING SEWAGE AND WASTE MATERIAL

Frederick B. Schilling, Bayside, N. Y., assignor to Nichols Engineering & Research Corporation, a corporation of Delaware Application April 6, 1935, Serial No. 14,988

8 Claims. (Cl. 110—12)

This invention relates to a process and apparatus for treating and burning waste materials such as sewage, garbage and trash, and the elimination of obnoxious odors from the gases evolved from the material during its treatment.

The invention provides an improved process and apparatus for efficiently and rapidly burning or drying such material, incinerating or burning the dried material, and eliminating by the use of the heat the obnoxious odors from gases produced during the process.

Various further and more specific objects, features and advantages will clearly appear from the detailed description given below, taken in connection with the accompanying drawing which forms a part of this specification and illustrates, merely by way of example, various embodiments of the apparatus of the invention.

The invention consists in such novel features, arrangements and combinations of parts as may be shown and described in connection with the furnace arrangements herein disclosed, by way of example only, and as illustrative of preferred embodiments, together with such novel methods and steps of processes as may also be described herein.

This application comprises a continuation in part of my application Ser. No. 664,884, filed April 7, 1933. This invention in certain of its phases is also more particularly directed to certain improvements to the invention described and claimed in the copending applications of Dudley Baird and Dudley Baird, et al., now Patents Nos. 2,015,051 and 2,015,050, granted September 17, 1935. The present invention involves auxiliary equipment and methods for adapting the invention of said Baird and Rowen applications to a wider variety of purposes and conditions.

In the drawing, Fig. 1 illustrates partly in section one form of incinerating apparatus for drying, or for drying and burning sewage sludge and for burning trash and refuse, and for utilizing the heat of the hot gases from the burning of the trash to assist in the drying or combustion of the sewage sludge and treatment of the gases therefrom to eliminate odors; and Fig. 2 is a view similar to Fig. 1 but illustrating an alternative embodiment of the apparatus.

In the above mentioned patent to Baird, et al., No. 2,015,050, reference to which is hereby made, methods and apparatus are disclosed for treating sewage sludge including the filtering of the sludge or otherwise eliminating therefrom a substantial proportion of the moisture content, then continuously introducing supplies of the filter cake into a multiple hearth furnace in which the cake becomes finely divided and is first thoroughly dried and then incinerated to produce a uniformly finely divided ash free of organic material, form finely divided ash free of organic material, and gaseous products of combustion free of odor. Such a process, if carefully regulated, may be carried out with a relatively small expenditure for fuel and may under some circumstances be carried out without burning any fuel in addition to the fuel value of the filter cake, although in order safely to meet varying conditions, it is preferable to use some fuel to insure thorough incineration of the moist filter cake, and elimination of odors from the gases. In many municipal plants for the disposal of sewage and refuse, considerable quantities of trash and the like miscellaneous refuse having relatively high fuel values, are available. However, much of such material is quite irregular in character, composition and size, so that it cannot be conveniently mixed with the sewage sludge or with the filter cake in the process above referred to for the purpose of adding fuel value, without interfering with the filtering action or without disturbing the proper uniform rabbling action in the multiple hearth furnace, with the consequent disturbance of the temperature conditions at the various hearths and preventing uniform elimination of the obnoxious characteristics of the resulting gases and ash. In accordance with my invention, however, such trash, refuse and other waste material is incinerated separately from the treatment of the sewage sludge and yet the two operations may be carried out in apparatus comprising a unitary or substantially unitary structure, and in such a way that the high heat value of the trash may be utilized to assist in the drying or combustion of the sewage sludge and the treatment of the resulting gases for the elimination of odor.

In Fig. 1 a multiple hearth furnace is shown at 10 having a plurality of superposed hearths as at 11 surrounded and supported by a furnace wall structure as at 12. A central rotatable shaft 13 may be provided with radially extending rabble arms as at 14 for rabbling the material over each of the hearths in succession down through the furnace. Each of the hearths is provided with gas ports through which the material may be discharged to the hearth below, hearth 11, for example, being provided with a central port or opening 15, and each succeeding alternate hearth below hearth 11 may likewise be provided with central openings, whereas the other hearths may be provided with peripheral openings whereby the gases evolved from the material under treatment are permitted to pass upwardly through the furnace in succession over the various hearths and from hearth to hearth countercurrent to the path of travel of the material.

The sewage sludge is first treated by one of the well-known sedimentation processes or other methods for eliminating much of the water content. Thereafter the sludge may be filtered to form a filter cake or otherwise treated to further reduce the moisture content. The filter cake or the like is then preferably continuously introduced into the furnace 10 as by a screw feed 16 or other suitable means substantially sealing the intake against the escape or entrance of gases or air at this point. The filter cake may then be dried and incinerated in the furnace substantially in accordance with the process as described in said Baird, et al. Patent No. 2,015,050, the resulting ash being delivered from the furnace through an outlet as at 17 to an ash hopper or other closed receptacle.

As to constructional features of the portions of the furnace above referred to, but not specifically described in detail, the usual design of furnaces of this general type may be followed; also reference may be had to the United States patents to Herreshoff, No. 976,175 of November 22, 1910, and Baird, No. 1,669,925 of May 15, 1928.

In addition to the hearths with rabbling means for treating the sewage sludge filter cake as above referred to the furnace 10 may be provided at its lower portion with a chamber 18. This chamber is designed for the burning of the trash and the like refuse and waste material, particularly that which is in bulky form having a high heat value. This material may be introduced into this chamber, for example, through doors 19 provided with draft inlets as at 20. The hot gases and air from this chamber may pass through an outlet as at 21 to a conduit or stack 22. If desired, a part of such hot gases may be introduced as through conduits 23, 24 and 25 to the space above various hearths where the sewage sludge is being incinerated in the furnace, thus supplying heat from the burning trash in lieu of or in addition to the use of oil burners for aiding in the combustion of the sewage sludge in the furnace. The amount of such hot gases thus introduced over the various hearths may be regulated as desired by the use of dampers as indicated at 26. The remainder of the hot gases from the burning trash or the like may be conveyed up to the top of the conduit 22 where they are mixed with gases coming from an outlet 27 at the top of the furnace. With this arrangement the gaseous products of combustion coming from the sewage sludge incinerating hearths may be mixed directly with the hot gases from the trash burning chamber and thereby raised to a temperature such as to decompose or burn any remaining obnoxious content thereof.

If desired, a substantial portion of the hot gases from the conduit 22 may be admitted to the furnace through a conduit 28 near the top of the furnace so that the obnoxious gases within the furnace are subjected to the requisite high temperature to eliminate the odors before the gases leave the furnace. Dampers as at 29, 30 and 31 may be provided in the conduits 22, 27 and 28 respectively for regulating the flow of gases in the desired manner through these conduits and at the top of the furnace.

The chamber 18 may preferably be lined with suitable refractory material, as indicated at 32 to withstand the relatively high temperatures within this chamber. The various gas conduits are also preferably suitably insulated to retain the heat of the gases, although such insulation is omitted in the drawing for convenience of illustration.

In order to insure proper control of the temperature at the various hearths in the furnace 10 even though burning of the waste material in the chamber 18 may be interrupted, oil burners as at 33 are preferably made available at various hearths. In order to insure complete elimination of noxious odors from the gases evolved from the burning sewage sludge, these gases may be raised to a temperature for example of from 1300° to 1400° F., or at least above 1000° F. In the above described apparatus such temperatures may be economically secured either within the furnace 10 or just at the outlet 27 where the gases are mixed with the hot gases from the burning trash.

In cases where it may be found possible or desirable to recover fertilizer values from the sewage sludge, then the furnace 10 may be utilized merely to thoroughly and uniformly dry the finely divided sludge or filter cake. In this event the various hot air intakes from the conduit 22 to the furnace 10 may be so adjusted as to merely permit sufficient hot gases to enter the furnace 10 to uniformly dry the sludge without substantial combustion thereof. For this purpose the temperatures within the furnace 10 may be kept in the neighborhood just above the boiling point of water, but insufficient to cause scorching of the material or any substantial evolution of noxious gases. In case the gases from the trash burning chamber are so hot that they may tend to cause scorching or burning of the material in the furnace 10 when it is desired only to dry the same, then provision may be made as shown in Fig. 2, for introducing cold or relatively cool air, together with the hot gases, through one or more of the conduits as at 23, 24 or 25. For this purpose, for example, air conduits as at 35 may be provided and the amount of cold air admitted from a source 36 may be regulated as by valves 37. If desired, the valves such as at 37 may be arranged to be adjusted and regulated automatically by any well-known means controlled by temperature changes occurring at the various hearths within the furnace.

Under some circumstances it may be found possible or desirable to mix with the sewage sludge or filter cake material being incinerated within the furnace 10, a quantity of garbage or like waste material providing it is of such nature as not to interfere with the proper rabbling action and desired temperature conditions.

In Fig. 2 an arrangement similar to that of Fig. 1 is illustrated except that a trash burning chamber 34 is provided adjacent to and outside of the bottom portion of the furnace. In other respects the construction of Fig. 2 and the various parts thereof which correspond to those of the apparatus of Fig. 1, may be readily understood without further description. The construction of Fig. 2 is advantageous where it is found desirable to provide a larger number of hearths within a space of the same height as for the construction of Fig. 1.

It will be apparent that with the above described invention a compact apparatus which may comprise a unitary or substantially unitary structure is provided for efficiently treating most of the various waste materials which are ordinarily collected at municipal disposal plants. The confining of the apparatus to a substantial unitary structure, not only insures against waste of heat and the escape of obnoxious gases and dust, but also makes possible substantial savings in the size and cost of buildings for housing the apparatus as compared with the buildings generally necessary with the prior art practices.

With the above described methods, it will be observed that the problem of eliminating trash and the like waste material is conveniently overcome while utilizing this material as an economical source of heat for aiding in the drying or burning of the sewage sludge, yet without danger of interference with the efficient and uniform treatment of the sludge.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent of the United States is:

1. An incinerating furnace comprising a plurality of superposed hearths supported and embraced by a furnace wall, means for feeding the material to be treated into the top part of the furnace, means for rabbling the material from hearth to hearth down through the furnace, the hearths being provided with gas ports whereby gases evolved from the material may pass upwardly through the furnace to the top thereof, a chamber at the bottom of the furnace within the furnace walls for receiving trash or the like waste material of high heat value, conduit means for conducting hot gases from said chamber, and means for conveying the exit gases from the top of the furnace into said conduit means whereby such exit gases may be mixed with the hot gases in the conduit coming from the burning trash, and the obnoxious odors of the exit gases will thereby be substantially decreased or eliminated.

2. An incinerating furnace comprising a plurality of superposed hearths supported and embraced by a furnace wall, means for feeding sewage sludge or the like material to be incinerated into the top part of the furnace, means for rabbling the material from hearth to hearth down through the furnace, the hearths being provided with gas ports whereby gases evolved from the material may pass upwardly through the furnace to the top thereof, a chamber at the bottom of the furnace within the furnace walls for receiving trash or the like readily combustible material of high heat value, means for conducting hot gases from said chamber into contact with the sludge on one or more of the lower incineration hearths of the furnace whereby the heat of such gases will assist in the incineration of the material on such hearths, and additional means for mixing a part of said hot gases with the exit gases of the furnace, whereby the latter gases will be raised to a temperature sufficient to decrease or substantially eliminate obnoxious odors therefrom.

3. The continuous process of treating sewage sludge and of simultaneously burning trash, rubbish or the like waste material of a high heat value, which comprises eliminating a substantial proportion of the moisture content of the sludge, then continuously passing a supply of such sludge successively through a plurality of zones, temporarily retaining said sludge in horizontal layers in each of said zones while periodically agitating it and causing it to be broken into finer pieces, in the presence of a countercurrent stream of heated air and gases, burning the trash separately from the treatment of said sludge, and introducing controlled amounts of the hot gaseous products of combustion from the trash directly in contact with the sludge being treated at a plurality of said zones to provide at least a substantial part of said countercurrent stream of air and heated gases and to control and maintain a desired high temperature at each of said plurality of zones.

4. In combination, a furnace comprising a plurality of superposed hearths supported and embraced by a furnace wall, means for continuously feeding sewage sludge into the top part of said furnace, means for rabbling said sludge from hearth to hearth down through the furnace, the hearths being provided with gas ports whereby gases or vapor evolved from the sludge may pass upwardly through the furnace to the top thereof, a chamber at the bottom of the furnace within the furnace walls for receiving trash or the like readily combustible waste material of high heat value, conduit means for conducting hot gases from said chamber to the space above one or more of the hearths of said furnace, for thereby mixing such hot gases with the gases and vapor as evolved from the sewage sludge being rabbled at said zones.

5. The process of drying sewage sludge and of simultaneously burning other waste material of irregular characteristics, which comprises passing a supply of the sludge successively through each of a plurality of drying zones, temporarily retaining said sludge as a layer in each of said zones while periodically agitating it, introducing said other waste material into a separate zone and burning the same therein, conducting hot gaseous products of combustion from said separate zone into contact with and over the layers of sludge in said drying zones to heat and dry said sludge and carry away moisture therefrom, introducing in addition to said hot gaseous products, controlled amounts of cooling air into said drying zones, sufficient to prevent substantial scorching of the sludge yet permitting said drying thereof, then withdrawing from the drying zones said gases together with vapor evolved from the sludge, and applying additional heat produced in said separate zone to such withdrawn gases and vapor for the destruction of obnoxious odors thereof.

6. The process of drying sewage sludge and simultaneously burning other waste material of irregular characteristics, which comprises eliminating a substantial portion of the water content of the sludge and then substantially continuously introducing the sludge successively into and through each of a plurality of zones, temporarily retaining said sludge as a layer in each of said zones while periodically agitating it, the sludge being caused to fall from zone to zone, introducing said other waste material into a separate zone and burning the same therein, conducting a part of the hot gaseous products of combustion from said separate zone into contact with and over the successive layers of sludge in said plurality of zones, and through the falling sludge, to heat and dry said sludge and carry away moisture therefrom, then withdrawing from said plurality of zones said gases together with vapor evolved from the sludge, and mixing such withdrawn gases and vapor directly with additional hot gases produced in said separate zone for raising the temperature of said withdrawn gases and vapor to 1000° F. or higher, for the destruction of obnoxious odors thereof.

7. The process of drying and then burning sewage sludge and of simultaneously burning other waste material of irregular characteristics, which comprises eliminating a substantial portion of the water content of the sludge, then substantially continuously introducing the sludge successively into and through each of a plurality of drying zones, temporarily retaining said sludge as a layer in each of said zones while periodically agitating it, the sludge being caused to fall from zone to zone, introducing said other waste material into a separate zone and burning the same therein, conducting a part of the hot gaseous products of combustion from said separate zone into contact with and over the successive layers of sludge in said drying zones, and through the falling sludge, to heat and dry said sludge and carry away moisture therefrom, mixing the vapors after being evolved from the drying sludge directly with additional hot gases produced in said separate zone, for raising the temperature of said vapors to 1000° F. or higher, for the destruction of obnoxious odors thereof, and burning the dried sludge after its passage from said drying zones with the aid of heat produced in said separate zone.

8. A furnace for incinerating sewage sludge or the like material comprising a plurality of superposed hearths embraced by a furnace wall, the upper hearths being provided for drying and the lower hearths for incinerating the material, means for substantially continuously feeding the material to be incinerated into the upper part of the furnace, means for rabbling the material over each hearth and from hearth to hearth down through the furnace, the hearths being provided with gas ports whereby gases evolved from the material may pass upwardly through the furnace and over each hearth thereof in succession, a chamber adjacent the bottom of the furnace for receiving other waste material of irregular characteristics and readily combustible, means for conducting a part of the hot gases produced in said chamber into contact with the sludge on one or more of the incineration hearths of the furnace, whereby the heat of such gases will assist in the incineration of the material on such hearths, additional means for conducting another part of said hot gases into contact with the sludge on said drying hearths, and means for mixing a further part of said hot gases directly with the exit gases of the furnace, whereby the latter gases will be raised to a temperature sufficient to substantially eliminate obnoxious odors therefrom.

FREDERICK B. SCHILLING.